(12) United States Patent
Gao et al.

(10) Patent No.: US 10,834,703 B2
(45) Date of Patent: Nov. 10, 2020

(54) RESOURCE SELECTION METHOD AND TERMINAL DEVICE

(71) Applicant: Huawei Technologies Co., Ltd., Guangdong (CN)

(72) Inventors: Lei Gao, Beijing (CN); Yi Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/367,769

(22) Filed: Mar. 28, 2019

(65) Prior Publication Data

US 2019/0223158 A1 Jul. 18, 2019

Related U.S. Application Data

(63) Continuation of application No. PCT/CN2016/101157, filed on Sep. 30, 2016.

(51) Int. Cl.
*H04W 72/02* (2009.01)
*H04W 68/00* (2009.01)
(Continued)

(52) U.S. Cl.
CPC ......... *H04W 72/02* (2013.01); *H04W 68/005* (2013.01); *H04W 72/0486* (2013.01);
(Continued)

(58) Field of Classification Search
CPC ... H04W 72/02; H04W 88/023; H04W 80/08; H04W 72/1263; H04W 72/0486; H04W 68/005
See application file for complete search history.

(56) References Cited

U.S. PATENT DOCUMENTS

2015/0215903 A1 7/2015 Zhao et al.
2015/0282166 A1 10/2015 Zhao et al.
(Continued)

FOREIGN PATENT DOCUMENTS

CN 103812786 A 5/2014
CN 103841653 A 6/2014
(Continued)

OTHER PUBLICATIONS

Huawei et al.,"UE autonomous resource selection", 3GPP TSG RAN WG1 Meeting #84, R1-160307, Feb. 15-19, 2016, 6 pages, St Julian's, Malta.
(Continued)

*Primary Examiner* — Steven H Nguyen
(74) *Attorney, Agent, or Firm* — Slater Matsil, LLP

(57) ABSTRACT

A resource selection method and terminal device are provided. The method includes: detecting, by a first terminal device, a plurality of resource locations before receiving a higher layer request; obtaining, by the first terminal device based on the plurality of resource locations, a first set in a first time window after the higher layer request is received; determining, by the first terminal device, that a quantity of resources in the first set is less than a preset first threshold; and selecting, by the first terminal device from a resource pool, a resource used to send the to-be-transmitted data. According to the method and the terminal device, impact on sending performance of another terminal device in a system can be reduced and sending performance of the terminal device can be improved.

14 Claims, 4 Drawing Sheets

(51) Int. Cl.
*H04W 72/04* (2009.01)
*H04W 72/12* (2009.01)
*H04W 80/08* (2009.01)
*H04W 88/02* (2009.01)

(52) U.S. Cl.
CPC ....... *H04W 72/1263* (2013.01); *H04W 80/08* (2013.01); *H04W 88/023* (2013.01)

(56) References Cited

U.S. PATENT DOCUMENTS

| | | | | |
|---|---|---|---|---|
| 2016/0338127 | A1* | 11/2016 | Matsumoto | H04W 72/0406 |
| 2018/0139724 | A1* | 5/2018 | Loehr | H04W 72/02 |
| 2018/0206211 | A1* | 7/2018 | Seo | H04W 72/02 |
| 2018/0249470 | A1* | 8/2018 | Seo | H04W 72/0493 |
| 2019/0045526 | A1* | 2/2019 | Lee | H04W 72/02 |
| 2019/0132818 | A1* | 5/2019 | Yasukawa | H04W 72/08 |
| 2019/0174530 | A1* | 6/2019 | Kim | H04L 1/0003 |
| 2019/0254091 | A1* | 8/2019 | Kim | H04L 1/0009 |

FOREIGN PATENT DOCUMENTS

| | | |
|---|---|---|
| CN | 105657842 A | 6/2016 |
| CN | 105960023 A | 9/2016 |
| WO | 2015111875 A1 | 7/2015 |
| WO | 2016078551 A1 | 5/2016 |

OTHER PUBLICATIONS

Intel Corporation, "Transmitter behavior for sidelink resource (re)selection", 3GPP TSG RAN WG1 Meeting #86, R1-166512, Aug. 22-26, 2016, 6 pages, Gothenburg, Sweden.

* cited by examiner

RESOURCE SELECTION METHOD AND TERMINAL DEVICE

CROSS-REFERENCE TO RELATED APPLICATIONS

This application is a continuation of International Application No. PCT/CN2016/101157, filed on Sep. 30, 2016, the disclosure of which is hereby incorporated by reference in its entirety.

TECHNICAL FIELD

The present application relates to the communications field, and in particular, to a resource selection method and terminal device in the communications field.

BACKGROUND

In recent years, people pay increasing attention to an Internet of Vehicles technology. An Internet of Vehicles system includes vehicle to vehicle (V2V) communication, vehicle to infrastructure (V2I) communication, vehicle-to-pedestrian (V2P) communication, vehicle-to-network (V2N) communication, and the like.

To ensure safe driving of a vehicle, data needs to be periodically exchanged between user equipment in the Internet of Vehicles system. Currently, in the Internet of Vehicles system, a resource that can be used to send data is selected mainly by continuously increasing a threshold for reference signal received power (RSPP) measurement of the data. In a prior-art solution, the threshold may be improperly increased. Consequently, a probability of selecting a resource with excessively high RSRP is relatively high, sending performance of another user equipment in the system is affected, and performance of sending the data by the user equipment is poor.

SUMMARY

In view of this, embodiments of the present disclosure provide a resource selection method and terminal device, so that impact on sending performance of another terminal device in a system can be reduced and sending performance of the terminal device can be improved.

According to a first aspect, a resource selection method is provided, and the method includes: detecting, by a first terminal device, a plurality of resource locations before receiving a higher layer request; obtaining, by the first terminal device based on the plurality of resource locations, a first set in a first time window after the higher layer request is received, where the higher layer request is used to notify the first terminal device that there is to-be-transmitted data and that a sending resource needs to be selected for the to-be-transmitted data; determining, by the first terminal device, that a quantity of resources in the first set is less than a preset first threshold; and selecting, by the first terminal device from a resource pool, a resource used to send the to-be-transmitted data, where the resource pool is a resource pool from which the sending resource is randomly selected.

If a quantity of resources in an available resource is less than the preset first threshold, the first terminal device selects a resource from the resource pool in which random selection of the sending resource is allowed, so that impact on sending performance of another terminal device in a system can be reduced and sending performance of the first terminal device can be improved.

In a possible design, the detecting, by a first terminal device, a plurality of resource locations before receiving a higher layer request includes: detecting, by the first terminal device, the plurality of resource locations based on system congestion information notified by a network device; or detecting, by the first terminal device, the plurality of resource locations based on a notification message of a network device, where the notification message is determined based on system congestion information.

In a possible design, the system congestion information or the notification message may alternatively be sent by another terminal device.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, a set including the resource mapped in the at least one resource location.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send next data that are respectively indicated by N pieces of successfully decoded scheduling assignment information used before the higher layer request is received belong to a set including the resource mapped in the at least one resource location; and determining, by the first terminal device as the first set, all resources in the set including the resource mapped in the at least one resource location except a resource in a second set, where the second set includes a sum of the reserved resources indicated by the N pieces of successfully decoded scheduling assignment information, and N is a positive integer.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determining, by the first terminal device as the first set, all resources in the set including the resource mapped in the at least one resource location except a resource in a third set, where the third set includes a sum of the reserved resources indicated by the M pieces of successfully decoded scheduling assignment information, and M is a positive integer.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, all resources in a set including the resource mapped in the at least one resource location except a resource in a fourth set, where the fourth set includes a resource on which received energy obtained based on a detection result through prediction is greater than a preset third threshold.

In a possible design, the selected resource used to send the to-be-transmitted data is not used to send subsequent data, and the method further includes: sending, by the first terminal device, scheduling assignment information to a second terminal device, where the scheduling assignment information is used to indicate that the selected resource used to send the to-be-transmitted data is not used to send the subsequent data.

The first terminal device does not reserve resources, and instructs another terminal device not to reserve resources, so that a continuous collision between resources can be avoided.

In a possible design, the resource pool overlaps a resource in the first time window, and the selecting, from a resource pool by the terminal device, a resource used to send the to-be-transmitted data includes: selecting, from the resource pool by the terminal device based on K pieces of successfully decoded scheduling assignment information used before the higher layer request is received, the resource used to send the to-be-transmitted data, where all the reserved resources respectively indicated by the K pieces of successfully decoded scheduling assignment information overlap the resource pool, and K is a positive integer.

In a possible design, the preset first threshold is a quantity of resources that need to be selected by the terminal device; or the preset first threshold is a quantity of resources in a fifth set, and the fifth set is used by the first terminal device to select the sending resource from the fifth set.

In a possible design, the preset second threshold and/or the preset third threshold may be determined by the first terminal device based on system congestion information, a channel busy degree, or other information reported by the network device or the another terminal device, or may be specified in a protocol or configured or preconfigured by the network device based on system congestion information, a channel busy degree, or the like.

In a possible design, the preset first threshold may also be determined based on system congestion information, a channel busy degree, or other information. The preset first threshold may be determined by the network device to be delivered to the first terminal device by using signaling, or may be determined by the first terminal device based on various pieces of congestion information reported by the network device or the another terminal device.

According to a second aspect, a resource selection method is provided, and the method includes: detecting, by a first terminal device, a plurality of resource locations before receiving a higher layer request; obtaining, by the first terminal device based on the plurality of resource locations, a first set in a first time window after the higher layer request is received, where the higher layer request is used to notify the first terminal device that there is to-be-transmitted data and that a sending resource needs to be selected for the to-be-transmitted data; determining, by the first terminal device, that a quantity of resources in the first set is less than a preset first threshold, where the preset first threshold is a quantity of resources in a fifth set, and the fifth set is used by the first terminal device to select the sending resource from the fifth set; and selecting, by the first terminal device from the first set, a resource used to send the to-be-transmitted data, where the selected resource used to send the to-be-transmitted data is not used to send subsequent data.

When determining that the quantity of resources in the first set is less than the preset first threshold, the first terminal device does not reserve resources for the subsequent data, so that a continuous collision between resources can be avoided.

In a possible design, the detecting, by a first terminal device, a plurality of resource locations before receiving a higher layer request includes: detecting, by the first terminal device, the plurality of resource locations based on system congestion information notified by a network device; or detecting, by the first terminal device, the plurality of resource locations based on a notification message of a network device, where the notification message is determined based on system congestion information.

In a possible design, the system congestion information or the notification message may alternatively be sent by another terminal device.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, a set including the resource mapped in the at least one resource location.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by N pieces of successfully decoded scheduling assignment information used before the higher layer request is received belong to a set including the resource mapped in the at least one resource location; and determining, by the first terminal device as the first set, all resources in the set including the resource mapped in the at least one resource location except a resource in a second set, where the second set includes a sum of the reserved resources indicated by the N pieces of successfully decoded scheduling assignment information, and N is a positive integer.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determining, by the first terminal device as the first set, all resources in the set including the resource mapped in the at least one resource location except a resource in a third set, where the third set includes a sum of the reserved resources indicated by the M pieces of successfully decoded scheduling assignment information, and M is a positive integer.

In a possible design, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, all resources in a set including the resource mapped in the at least one resource location except a resource in a fourth set, where the fourth set includes a resource on which received energy obtained based on a detection result through prediction is greater than a preset third threshold.

In a possible design, the method further includes: sending, by the first terminal device, scheduling assignment information to a second terminal device, where the scheduling assignment information is used to indicate that the selected resource used to send the to-be-transmitted data is not used to send the subsequent data.

In a possible design, the preset second threshold and/or the preset third threshold may be determined by the first terminal device based on system congestion information, a channel busy degree, or other information reported by the network device or the another terminal device, or may be specified in a protocol or configured or preconfigured by the network device based on system congestion information, a channel busy degree, or the like.

In a possible design, the preset first threshold may also be determined based on system congestion information, a channel busy degree, or other information. The preset first threshold may be determined by the network device to be delivered to the first terminal device by using signaling, or may be determined by the first terminal device based on various pieces of congestion information reported by the network device or the another terminal device.

According to a third aspect, a terminal device is provided, and is configured to perform the method in any one of the first aspect or the possible implementations of the first aspect. Specifically, the terminal includes a unit configured to perform the method in any one of the first aspect or the possible implementations of the first aspect.

According to a fourth aspect, a terminal device is provided, and is configured to perform the method in any one of the second aspect or the possible implementations of the second aspect. Specifically, the terminal device includes a unit configured to perform the method in any one of the second aspect or the possible implementations of the second aspect.

According to a fifth aspect, a terminal device is provided, and the terminal device includes a memory, a processor, and a transceiver. The memory is configured to store an instruction. The processor is configured to execute the instruction stored in the memory. When executing the instruction, the processor performs the method in the first aspect, and controls the transceiver to receive input data and information and output data such as an operation result.

According to a sixth aspect, a terminal device is provided, and the terminal device includes a memory, a processor, and a transceiver. The memory is configured to store an instruction. The processor is configured to execute the instruction stored in the memory. When executing the instruction, the processor performs the method in the second aspect, and controls the transceiver to receive input data and information and output data such as an operation result.

According to a seventh aspect, a computer storage medium is provided, and is configured to store a computer software instruction used in the foregoing method. The computer software instruction includes a program designed for performing the foregoing aspect.

In the present disclosure, names of the terminal device and the network device constitute no limitation on the devices. In actual implementation, these devices may be shown in other names. Provided that a function of each device is similar to that in the present disclosure, the device falls within the scope of the claims of the present disclosure and their equivalent technologies.

These aspects or other aspects of the present disclosure are more concise and understandable in descriptions of the following embodiments.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions in the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD)

system, an LTE time division duplex (TDD) system, a Universal Mobile Telecommunications System (UMTS), a Worldwide Interoperability for Microwave Access (Wi-MAX) communications system, or a future 5G system.

Particularly, the technical solutions in the embodiments of the present disclosure may be applied to various communications systems that are based on a non-orthogonal multiple access technology, for example, a sparse code multiple access (SCMA) system and a low density signature (LDS) system. Certainly, the SCMA system and the LDS system may also be referred to as other names in the communications field. Further, the technical solutions in the embodiments of the present disclosure may be applied to a multi-carrier transmission system that uses the non-orthogonal multiple access technology, for example, an orthogonal frequency division multiplexing (OFDM") system, a filter bank multicarrier (FBMC) system, a generalized frequency division multiplexing (GFDM) system, or a filtered-orthogonal frequency division multiplexing (F-OFDM) system that uses the non-orthogonal multiple access technology.

In the 3rd Generation Partnership Project (3GPP) protocol, device-to-device (D2D) communication has been standardized. The D2D communication is a technology that supports direct data communication between mobile devices by using a dedicated air interface technology. The D2D communication may be an Internet of Vehicles technology that attracts increasing attention in recent years. An Internet of Vehicles system may include vehicle to vehicle (V2V) communication or V2X communication. In the V2X communication, X may generally mean any device having a wireless receiving and sending capability, for example, X may be but is not limited to a slow-moving wireless apparatus, a fast-moving in-vehicle device, or a network control node having a wireless transmitting and receiving capability.

Figure 1:
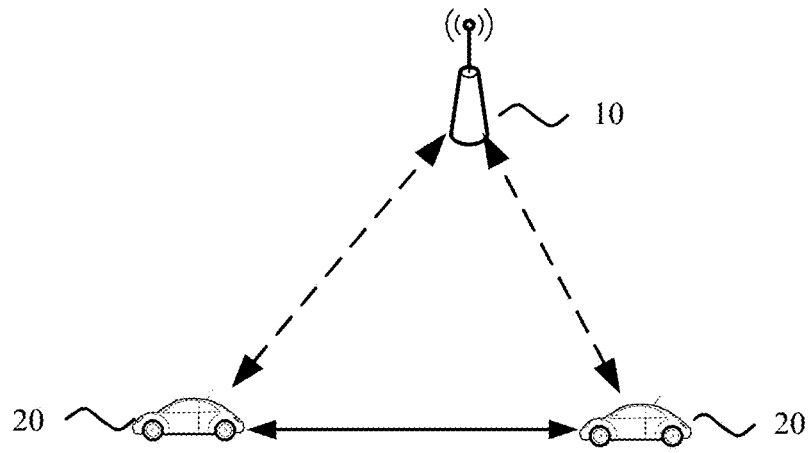
FIG. 1 is a diagram of an application scenario according to an embodiment of the present disclosure.

FIG. 1 is a schematic diagram of an application scenario according to an embodiment of the present disclosure. A V2X communication scenario in FIG. 1 is used as an example for description. However, this embodiment of the present disclosure may also be applied to any other D2D communication scenario. This is not limited in the present disclosure.

It should be understood that a terminal device 20 in FIG. 1 may be mobile or fixed. The terminal device 20 may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like. This is not limited in this embodiment of the present disclosure.

It should be further understood that a network device 10 in FIG. 1 may be a device configured to communicate with the terminal device 20. The network device 10 may be a base transceiver station (BTS) in GSM or CDMA, or a NodeB (NB) in a WCDMA system, or an evolved NodeB (eNB or eNodeB) in an LTE system, or a radio controller in a cloud radio access network (CRAN) scenario. Alternatively, the network device may be a relay node, an access point, an in-vehicle device, a wearable device, a network device in a future 5G network, a network device in a future evolved PLMN network, or the like. This is not limited in this embodiment of the present disclosure.

Specifically, the terminal device may communicate in a cellular communication mode or a D2D communication mode. In the cellular communication mode, the terminal device communicates with another terminal device by using a cellular link between the terminal device and the network device. In the D2D communication mode, the two terminal devices directly communicate with each other by using a D2D link.

When the terminal device performs D2D communication (for example, V2V communication or V2X communication), the terminal device may independently select a transmission resource, or the network device may assign, to the terminal device, a transmission resource used when the D2D communication is performed. It should be understood that this embodiment of the present disclosure is mainly applicable to an Internet of Vehicles system, a D2D system, or another sidelink communications system. The terminal device can independently select the sending resource whether the network device participates or not. The present disclosure is not limited thereto.

Figure 2:
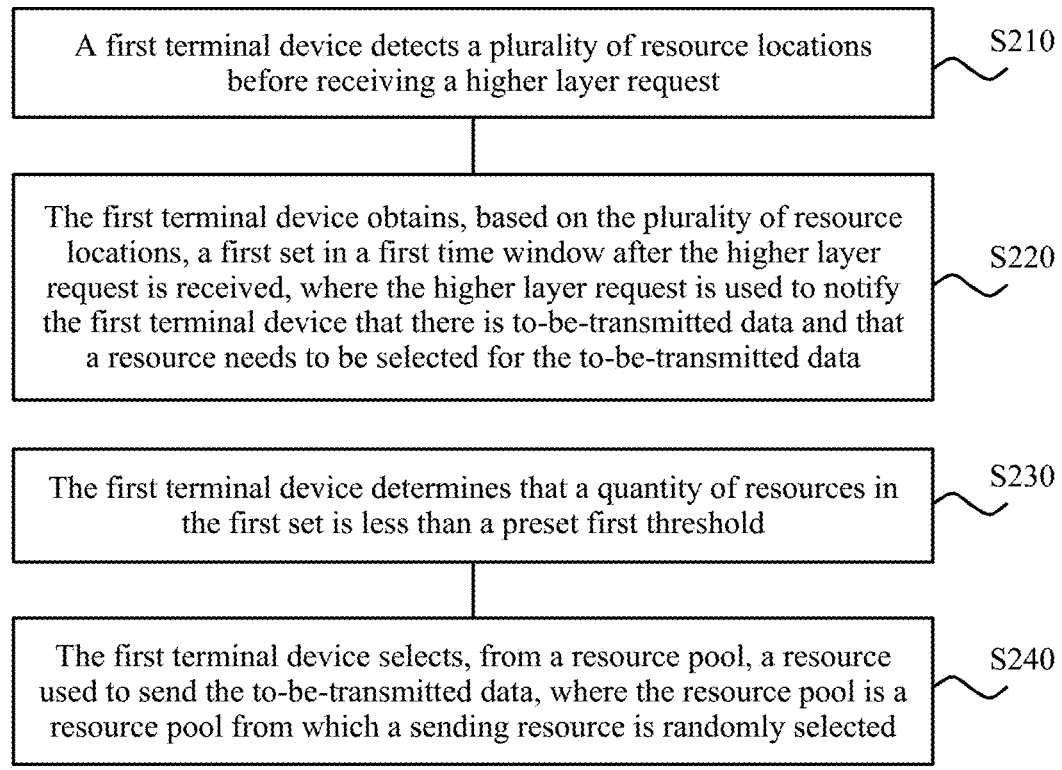
FIG. 2 is a schematic block diagram of a resource selection method according to an embodiment of the present disclosure.

FIG. 2 is a schematic block diagram of a resource selection method 200 according to an embodiment of the present disclosure. FIG. 2 shows steps or operations of the resource selection method, but these steps or operations are merely examples. Other operations or variants of the operations in FIG. 2 may be further performed in this embodiment of the present disclosure. As shown in FIG. 2, the method may be performed by a terminal device, and specifically, may be performed by a terminal device having a sidelink receiving or detection capability. The method 200 includes the following steps:

S210. A first terminal device detects a plurality of resource locations before receiving a higher layer request.

S220. The first terminal device obtains, based on the plurality of resource locations, a first set in a first time window after the higher layer request is received, where the higher layer request is used to notify the first terminal device that there is to-be-transmitted data and that a sending resource needs to be selected for the to-be-transmitted data.

S230. The first terminal device determines that a quantity of resources in the first set is less than a preset first threshold.

S240. The first terminal device selects, from a resource pool, a resource used to send the to-be-transmitted data, where the resource pool is a resource pool from which the sending resource is randomly selected.

The first terminal device may detect all resource locations at which the first terminal device does not send data. Specifically, the first terminal device may perform detection in a time window before the higher layer request is received used to notify the terminal device that there is the to-be-transmitted data. For example, the time window may be 1 second. The first terminal device may detect all possible resource locations in the time window, obtain, based on the detected resource locations, the first set in another time window after the higher layer request is received, and determine the quantity of resources included in the first set. If the first terminal device determines that the quantity of resources included in the first set is less than the preset first threshold, for example, the quantity of resources is less than a quantity of resources that need to be selected, the first terminal device may select, from the resource pool in which random selection of the sending resource is allowed, the resource used to send the to-be-transmitted data. Usually, the resource pool in which random selection of the sending resource is allowed is a common resource pool of a plurality of terminal devices. The higher layer request is used to notify the first terminal device that the to-be-transmitted data needs to be sent. In this embodiment of the present disclosure, the higher layer request may be further used to indicate that the sending resource needs to be selected for the to-be-transmitted data.

Therefore, according to the resource selection method provided in this embodiment of the present disclosure, if a quantity of resources in an available resource is less than the preset first threshold, the first terminal device selects a resource from the resource pool in which random selection of the sending resource is allowed, so that impact on sending performance of another terminal device in a system can be reduced and sending performance of the first terminal device can be improved.

It should be understood that the resource in the first set in this embodiment of the present disclosure may be obtained based on the detected resource locations. It may mean that the first terminal device detects all resources in a first time window before receiving of a predicted higher layer request, to obtain all resources in a second time window after the higher layer request is received. For example, the first time window is one (1) second, and the second time window is 50 ms. Alternatively, it may mean that the first terminal device periodically detects a same resource location in each detection period before receiving of a predicted higher layer request, to obtain a resource occupation status of a same location in a second time window after the higher layer request is received. Typically, the detection period is 100 ms, and a quantity of detection periods is greater than or equal to 10. In other words, if the first terminal device detects the same location within 10 consecutive detection periods before the arriving of the higher layer request, the first terminal device may predict the occupation status of the same location in the second time window. How a location of the resource in the first set is obtained based on the detected resource locations is not limited in this embodiment of the present disclosure.

It should be further understood that the preset first threshold in this embodiment of the present disclosure may be a quantity of resources that need to be selected by the first terminal device, or may be a quantity of resources from which the first terminal device selects a required resource. For example, if there are five resources in the first set determined by the first terminal device, and there are six resources that need to be selected by the first terminal device, the quantity of resources in the first set is less than the quantity of resources that need to be selected. In this case, the first terminal device may select the sending resource from the resource pool in which random selection of the sending resource is allowed. For another example, the first terminal device needs to select one resource from the six resources to ensure a degree of randomly selecting the resource by the first terminal device. If the quantity of resources in the first set is less than 6 in this case, it may be considered that the quantity of resources in the first set is also less than the preset first threshold, and the preset first threshold may be 6. It should be understood that the quantity of resources is merely used for illustration, and does not affect the scope of the technical solution. In a special embodiment, the first terminal device triggers resource selection at a moment before arriving of a predicted higher layer request. For example, an event that requires the resource selection suddenly occurs at a moment 100 ms before the arriving of the higher layer request, and a quantity of resources obtained by the first terminal device based on a previous detection situation is likely to be insufficient for or is still not applied to detection of current resource reselection. In this case, the first terminal device may select the sending resource from the resource pool in which random selection of the sending resource is allowed.

In an optional solution in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, a set including the resource mapped in the at least one resource location.

Figure 3:
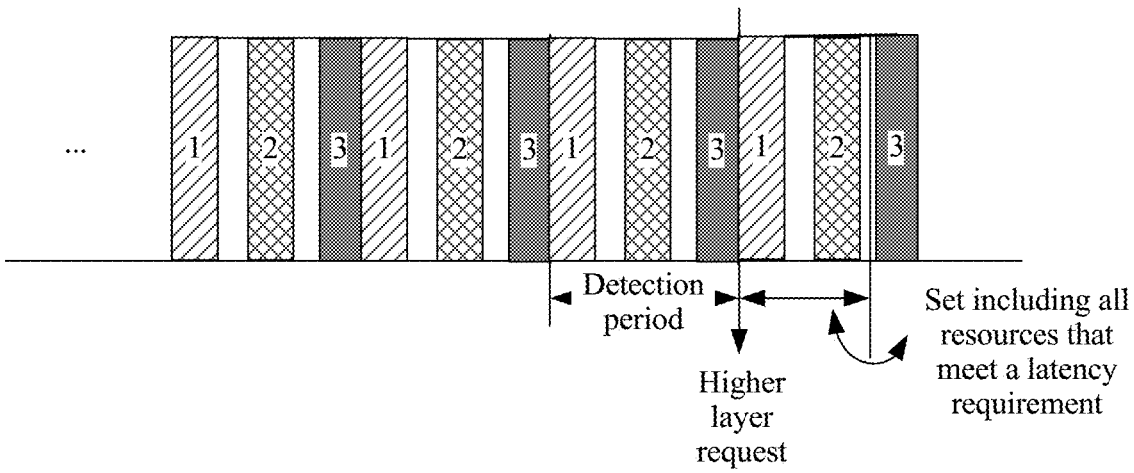
FIG. 3 is a schematic diagram of determining a first set according to an embodiment of the present disclosure.

It can be learned from the foregoing description that the first terminal device may determine, as the first set, resources in the first time window that are mapped at the resource locations detected before the predicted higher layer request is received. Specifically, as shown in FIG. 3, a resource block 1, a resource block 2, and a resource block 3 that are detected at a same location in each detection period before the arriving of the higher layer request may be mapped to resources: a resource block 1, a resource block 2, and a resource block 3 that are obtained after the higher layer request is received. However, after mapping, only the resource block 1 and the resource block 2 belong to a set including all resources included in the first time window, and the resource block 1 and the resource block 2 that are mapped after the higher layer request is received may be determined as the first set.

Further, the first terminal device may attempt to perform decoding at a sending resource location at which any piece of scheduling assignment (SA) information used before the arriving of the higher layer request may be used. If the decoding succeeds, the first terminal device may determine whether the successfully decoded SA indicates a sending resource location for subsequent data transmission, that is, whether a terminal device that sends the SA reserves resources for the subsequent data. If the reserved resources are in an available resource obtained by the first terminal device based on a detection result, the first terminal device may select the sending resource from an available resource obtained after these reserved resources are excluded. Specifically, the first terminal device may obtain a resource occupation and reservation status of another terminal device before the higher layer request arrives, to exclude a resource that causes the first terminal device to conflict with the other terminal device. It should be understood that the SA is mainly used to indicate resource location information of current data transmission in a current period, reserved resource location information of another data retransmission in the current period, priority information, reserved sending resource location information of current transmission for the subsequent data, reserved sending resource location information of another retransmission for the subsequent data, and the like.

In an Internet of Vehicles system, to ensure safe driving of a vehicle, status information needs to be periodically exchanged between terminal devices. The exchanged status information includes information such as a location, a speed, or a status of the vehicle, and is broadcast to a surrounding vehicle. The terminal devices may determine and make a warning for a potential danger by analyzing received exchanged status information of the surrounding vehicle, to reduce a disaster occurrence possibility. A service period of the exchanged status information ranges from 100 ms to 1000 ms. In this case, when a plurality of terminal devices send data at a same time, if resources are improperly selected, a collision between the resources is likely to occur. Consequently, sending performance of the system is affected, and still further, sending performance of the terminal devices is also affected.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by N pieces of successfully decoded scheduling assignment information used before the higher layer request is received belong to a set including the resource mapped in the at least one resource location; and determining, by the first terminal device as the first set, all resources in the set including the resource mapped in the at least one resource location except a resource in a second set, where the second set includes a sum of the reserved resources indicated by the N pieces of successfully decoded scheduling assignment information, and N is a positive integer.

For example, an unavailable resource may be further excluded from the resource block 1 and the resource block 2 that are obtained after the higher layer request is received in FIG. 3. Specifically, if a reserved resource indicated by the SA information obtained through decoding overlaps some resources in the obtained resource block 1, the overlapping resources may be further excluded. The first terminal device determines whether a quantity of resources in an available resource obtained after the resources overlapping the reserved resource are excluded is less than the preset first threshold. If the quantity of resources in the available resource is less than the preset first threshold, the first terminal device selects the sending resource from the resource pool in which random selection of the sending resource is allowed.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determining, by the first terminal device as the first set, all resources in the set including the resource mapped in the at least one resource location except a resource in a third set, where the third set includes a sum of the reserved resources indicated by the M pieces of successfully decoded scheduling assignment information, and M is a positive integer.

Specifically, the first terminal device may further determine whether reference signal received power (RSRP) on a resource that is occupied for current data transmission and that is indicated by the SA corresponding to the foregoing excluded resource block is greater than the preset second threshold. If the reference signal received power is greater than the preset second threshold, a resource that is corresponding to RSRP greater than the preset second threshold in the overlapping resources is excluded, to avoid a problem that when mutual interference between the first terminal device and another terminal device is relatively low because the another terminal device is relatively far away from the first terminal device, a resource reserved by the another terminal device can be used as the sending resource, but is excluded. Consequently, the quantity of resources in the first set is less than the preset first threshold. For example, both the resource block 1 and the resource block 2 are originally unavailable resources if resources in the resource block 1 and the resource block 2 in FIG. 3 are reserved resources indicated by the successfully decoded SA, RSRP values that are on the resource block 1 and the resource block 2 and that may be obtained through measurement are respectively 1 and 2, and the preset second threshold is 1.5. However, it can be learned, in comparison with the second threshold, that only a resource in the resource block 2 is unavailable, and a terminal device that occupies the resource block 1 is relatively far away from a current terminal device, so that the resource block 1 is an available resource. If a quantity of resources in the resource block 1 is greater than a quantity of resources that need to be selected, the first terminal device may select the sending resource from the resource block 1, to ensure that the first terminal device does not collide with the another terminal device.

It should be understood that the RSRP value is used as an example for description. The first terminal device may exclude the unavailable resource through energy or power type measurement or specifically through received power measurement. This is not limited in the present disclosure.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, all resources in a set including the resource mapped in the at least one resource location except a resource in a fourth set, where the fourth set includes a resource on which received energy obtained based on a detection result through prediction is greater than a preset third threshold.

Specifically, the terminal device may further directly exclude the resource on which the received energy obtained based on the detection result through prediction is greater than the preset third threshold, and determine whether a quantity of resources in an available resource obtained after exclusion is less than the preset first threshold. If the quantity of resources in the available resource is less than the preset first threshold, the terminal device directly selects the sending resource from the resource pool in which random selection of the sending resource is allowed. For example, the first terminal device may predict received energy on the resource block 1 and the resource block 2 in FIG. 3. If the first terminal device determines that the received energy on the resource block 2 is greater than the preset third threshold, the first terminal device may exclude the resource block 2. In this way, the first terminal device may further determine whether a quantity of resources in the resource block 1 is less than the preset first threshold. If the quantity of resources in the resource block 1 is less than the preset first threshold, the first terminal device may select the sending resource from the resource pool in which random selection of the sending resource is allowed.

Optionally, in this embodiment of the present disclosure, the selected resource used to send the to-be-transmitted data is not used to send subsequent data, and the method further includes: sending, by the first terminal device, scheduling assignment information to a second terminal device, where the scheduling assignment information is used to indicate that the selected resource used to send the to-be-transmitted data is not used to send the subsequent data.

Specifically, a detection-reservation mechanism is usually used in a current scenario in which the terminal device independently selects the sending resource. That is, each time reselecting a resource, the terminal device selects a reserved resource for subsequent data transmission. Before a condition for triggering the terminal device to reselect a resource again is met, the terminal device always sends data at each mapping location of the reserved resource. If a probability that a sending resource selected during previous resource reselection collides with a sending resource of another terminal device is relatively high, a resource selected by the terminal device for subsequently sending data continuously collides with a resource selected by the another terminal device, affecting sending performance of a system. However, when determining that the quantity of resources in the first set is less than the preset first threshold, the terminal device in this embodiment of the present disclosure does not reserve resources for subsequent data, and notifies, by sending SA information to the another terminal device, the another terminal device that no resource is reserved for subsequent data transmission. In other words, each time data arrives, the terminal device is triggered to reselect a resource, so that a continuous collision between resources can be avoided.

A person skilled in the art understands that the resource reselection may be triggered by a condition under which a quantity of times of continuously occupying a resource reaches a preset quantity of times. The terminal device may randomly select, based on a configured or preconfigured probability, whether to still use the selected resource to send data. Alternatively, the resource reselection may be triggered by another condition. In this embodiment of the present disclosure, the first terminal device reselects a resource each time data arrives, and notifies, by using an indication field in SA, the another terminal device that no resource is reserved for subsequent data transmission. Specifically, the indication field in the SA may be set to 0. The present disclosure may be further implemented by using another solution. This is not limited in the present disclosure.

Optionally, in this embodiment of the present disclosure, the resource pool in which random selection of the sending resource is allowed overlaps a resource in the first time window, and the selecting, by the terminal device from a resource pool in which random selection of the sending resource is allowed, a resource used to send the to-be-transmitted data includes: selecting, by the terminal device from the resource pool in which random selection of the sending resource is allowed based on K pieces of successfully decoded scheduling assignment information used before the arriving of the higher layer request, the resource used to send the to-be-transmitted data, where all the reserved resources respectively indicated by the K pieces of successfully decoded scheduling assignment information overlap the resource pool in which random selection of the sending resource is allowed, and K is a positive integer.

Specifically, if the resource pool in which selection of the sending resource is allowed overlaps some resources in the first time window, to further reduce a collision probability, the first terminal device may exclude, in the foregoing various implementations of excluding the unavailable resource, the resources from the resource pool in which selection of the sending resource is allowed, and select the sending resource from a remaining resource obtained after the exclusion is performed, so that impact on sending performance of another terminal device can be further avoided and sending performance of the first terminal device can be improved.

It should be understood that the preset second threshold and/or the preset third threshold mentioned above may be determined by the first terminal device based on system congestion information, a channel busy degree, or other information reported by a network device or another terminal device, or may be specified in a protocol or configured or preconfigured by a network device based on system congestion information, a channel busy degree, or the like. A manner of obtaining the second threshold and the third threshold is not limited in the present disclosure.

It should be further understood that the first threshold in this embodiment of the present disclosure may also be determined based on system congestion information, a channel busy degree, or other information. The first threshold may be determined by the network device to be delivered to the first terminal device by using signaling, or may be determined by the first terminal device based on various pieces of congestion information reported by the network device or the another terminal device. This is not limited in the present disclosure.

It should be further understood that in this embodiment of the present disclosure, the detecting, by a first terminal device, a plurality of resource locations before a higher layer request arrives includes: detecting, by the first terminal device, the plurality of resource locations based on system congestion information notified by a network device; or detecting, by the first terminal device, the plurality of resource locations based on a notification message of a network device, where the notification message is determined based on system congestion information.

Figure 4:
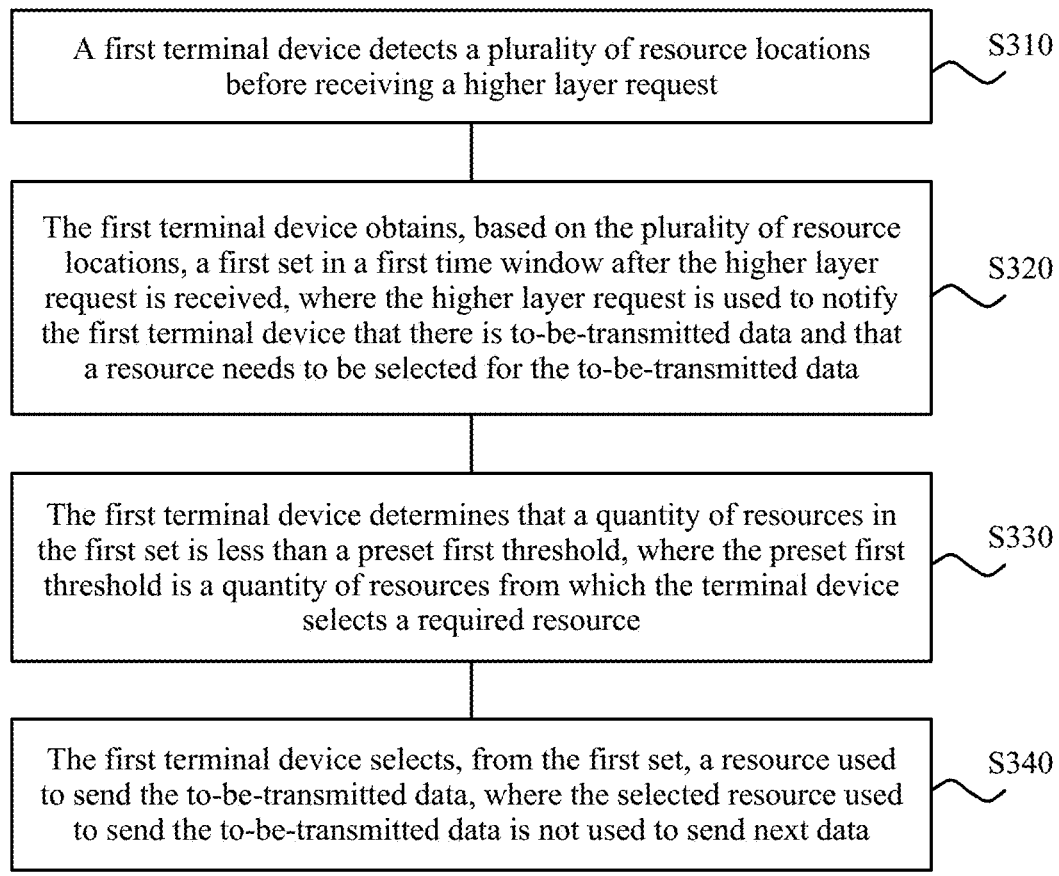
FIG. 4 is another schematic block diagram of a resource selection method according to an embodiment of the present disclosure.

FIG. 4 is a schematic block diagram of a resource selection method 300 according to an embodiment of the present disclosure. FIG. 4 shows steps or operations of the resource selection method, but these steps or operations are merely examples. Other operations or variants of the operations in FIG. 4 may be further performed in this embodiment of the present disclosure. As shown in FIG. 4, the method may be performed by a terminal device, and specifically, may be performed by a terminal device having a sidelink receiving or detection capability. The method 300 includes the following steps:

S310. A first terminal device detects a plurality of resource locations before receiving a higher layer request.

S320. The first terminal device obtains, based on the plurality of resource locations, a first set in a first time window after the higher layer request is received, where the higher layer request is used to notify the first terminal device that there is to-be-transmitted data and that a sending resource needs to be selected for the to-be-transmitted data.

S330. The first terminal device determines that a quantity of resources in the first set is less than a preset first threshold, where the preset first threshold is a quantity of resources in a fifth set, and the fifth set is used by the first terminal device to select the sending resource from the fifth set.

S340. The terminal device selects, from the first set, a resource used to send the to-be-transmitted data, where the selected resource used to send the to-be-transmitted data is not used to send subsequent data.

Specifically, when the first terminal device determines that a quantity of resources obtained based on detection is less than the preset first threshold, the first terminal device may not reserve resources, so that a continuous collision between resources can be avoided.

A detection-reservation mechanism is usually used in a current scenario in which the terminal device independently selects the sending resource. That is, each time reselecting a resource, the terminal device selects a reserved resource for subsequent data transmission. Before a condition for triggering the terminal device to reselect a resource again is met, the terminal device always sends data at each mapping location of the reserved resource. If a probability that a sending resource selected during previous resource reselection collides with a sending resource of another terminal device is relatively high, a resource selected by the terminal device for subsequently sending data continuously collides with a resource selected by the another terminal device, affecting sending performance of a system. However, when determining that the quantity of resources in the first set is less than the preset first threshold, the terminal device in this embodiment of the present disclosure does not reserve resources for subsequent data, and notifies, by sending SA information to the another terminal device, the another terminal device that no resource is reserved for subsequent data transmission. In other words, each time data arrives, the terminal device is triggered to reselect a resource, so that a continuous collision between resources can be avoided.

A person skilled in the art understands that the resource reselection may be triggered by a condition under which a quantity of times of continuously occupying a resource reaches a preset quantity of times. The terminal device may randomly select, based on a configured or preconfigured probability, whether to still use the selected resource to send data. Alternatively, the resource reselection may be triggered by another condition. In this embodiment of the present disclosure, the first terminal device reselects a resource each time data arrives, and notifies, by using an indication field in SA, the another terminal device that no resource is reserved for subsequent data transmission. Specifically, the indication field in the SA may be set to 0. The present disclosure may be further implemented by using another solution. This is not limited in the present disclosure.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations belongs to the first time window; and determining, by the first terminal device as the first set, a set including the resource mapped in the at least one resource location.

Specifically, as shown in FIG. 3, a resource block 1, a resource block 2, and a resource block 3 that are detected at a same resource location in each detection period before the arriving of the higher layer request may be mapped to resources: a resource block 1, a resource block 2, and a resource block 3 that are obtained after the higher layer request is received. However, after mapping, only the resource block 1 and the resource block 2 overlap a resource in the first time window, and the resource block 1 and the resource block 2 that are mapped after the higher layer request is received may be determined as the first set.

Further, the first terminal device may attempt to perform decoding at a sending resource location at which any piece of scheduling assignment (SA) information used before the arriving of the higher layer request may be used. If the decoding succeeds, the first terminal device may determine whether the successfully decoded SA indicates a sending resource location for subsequent data transmission, that is, whether a terminal device that sends the SA reserves resources for the subsequent data. If the reserved resources are in an available resource obtained by the first terminal device based on a detection result, the first terminal device may select the sending resource from an available resource obtained after these reserved resources are excluded. Specifically, the first terminal device may obtain a resource occupation and reservation status of another terminal device before the higher layer request arrives, to exclude a resource that causes the first terminal device to conflict with the other terminal device. It should be understood that the SA is mainly used to indicate resource location information of current data transmission in a current period, reserved resource location information of another data retransmission in the current period, priority information, reserved sending resource location information of current transmission for the subsequent data, reserved sending resource location information of another retransmission for the subsequent data, and the like.

In an Internet of Vehicles system, to ensure safe driving of a vehicle, status information needs to be periodically exchanged between terminal devices. The exchanged status information includes information such as a location, a speed, or a status of the vehicle, and is broadcast to a surrounding vehicle. The terminal devices may determine and make a warning for a potential danger by analyzing received exchanged status information of the surrounding vehicle, to reduce a disaster occurrence possibility. A service period of the exchanged status information ranges from 100 ms to 1000 ms. In this case, when a plurality of terminal devices send data at a same time, if resources are improperly selected, a collision between the resources is likely to occur. Consequently, sending performance of the system is affected, and still further, sending performance of the terminal devices is also affected.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by N pieces of successfully decoded scheduling assignment information used before the arriving of the higher layer request belong to a set including the resource mapped in the at least one resource location; and determining, by the first terminal device as the first set, all resources in the set including the resource mapped in the at least one resource location except a resource in a second set, where the second set includes a sum of the reserved resources indicated by the N pieces of successfully decoded scheduling assignment information, and N is a positive integer.

For example, an unavailable resource may be further excluded from the resource block 1 and the resource block 2 that are obtained after the higher layer request is received in FIG. 3. Specifically, if a reserved resource indicated by the SA information obtained through decoding overlaps some resources in the obtained resource block 1, the overlapping resources may be further excluded. The first terminal device determines whether a quantity of resources in an available resource obtained after the resources overlapping the reserved resource are excluded is less than the preset first threshold. If the quantity of resources in the available resource is less than the preset first threshold, the first terminal device selects the sending resource from the resource pool in which random selection of the sending resource is allowed.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; determining, by the first terminal device, that all reserved resources used to send subsequent data that are respectively indicated by M pieces of successfully decoded scheduling assignment information used before the arriving of the higher layer request belong to a set including the resource mapped in the at least one resource location, and that reference signal received power RSRP on resources used to send current data that are respectively indicated by the M pieces of successfully decoded scheduling assignment information is greater than a preset second threshold; and determining, by the first terminal device as the first set, all resources in the set including the resource mapped in the at least one resource location except a resource in a third set, where the third set includes a sum of the reserved resources indicated by the M pieces of successfully decoded scheduling assignment information, and M is a positive integer.

Specifically, the first terminal device may further determine whether reference signal received power (RSRP) on a resource that is occupied for current data transmission and that is indicated by the SA corresponding to the foregoing excluded resource block is greater than the preset second threshold. If the reference signal received power is greater than the preset second threshold, a resource that is corresponding to RSRP greater than the preset second threshold in the overlapping resources is excluded, to avoid a problem that when mutual interference between the first terminal device and another terminal device is relatively low because the another terminal device is relatively far away from the first terminal device, a resource reserved by the another terminal device can be used as the sending resource, but is excluded. Consequently, the quantity of resources in the first set is less than the preset first threshold. For example, both the resource block 1 and the resource block 2 are originally unavailable resources if resources in the resource block 1 and the resource block 2 in FIG. 3 are reserved resources indicated by the successfully decoded SA, RSRP values that are on the resource block 1 and the resource block 2 and that may be obtained through measurement are respectively 1 and 2, and the preset second threshold is 1.5. However, it can be learned, in comparison with the second threshold, that only a resource in the resource block 2 is unavailable, and a terminal device that occupies the resource block 1 is relatively far away from a current terminal device, so that the resource block 1 is an available resource. If a quantity of resources in the resource block 1 is greater than a quantity of resources that need to be selected, the first terminal device may select the sending resource from the resource block 1, to ensure that the first terminal device does not collide with the another terminal device.

It should be understood that the RSRP value is used as an example for description. The first terminal device may exclude the unavailable resource through energy or power type measurement or specifically through received power measurement. This is not limited in the present disclosure.

Optionally, in this embodiment of the present disclosure, the obtaining, by the first terminal device based on the plurality of resource locations, a first set in a first time window after the higher layer request is received includes: detecting, by the first terminal device, that a resource mapped in at least one of the plurality of resource locations is a resource in the first time window; and determining, by the first terminal device as the first set, all resources in a set including the resource mapped in the at least one resource location except a resource in a fourth set, where the fourth set includes a resource on which received energy obtained based on a detection result through prediction is greater than a preset third threshold.

Specifically, the terminal device may further directly exclude the resource on which the received energy obtained based on the detection result through prediction is greater than the preset third threshold, and determine whether a quantity of resources in an available resource obtained after exclusion is less than the preset first threshold. If the quantity of resources in the available resource is less than the preset first threshold, the terminal device directly selects the sending resource from the resource pool in which random selection of the sending resource is allowed. For example, the first terminal device may predict received energy on the resource block 1 and the resource block 2 in FIG. 3. If the first terminal device determines that the received energy on the resource block 2 is greater than the preset third threshold, the first terminal device may exclude the resource block 2. In this way, the first terminal device may further determine whether a quantity of resources in the resource block 1 is less than the preset first threshold. If the quantity of resources in the resource block 1 is less than the preset first threshold, the first terminal device may select the sending resource from the resource pool in which random selection of the sending resource is allowed.

It should be understood that the preset second threshold and/or the preset third threshold mentioned above may be determined by the first terminal device based on system congestion information, a channel busy degree, or other information reported by a network device, or may be specified in a protocol or configured or preconfigured by a network device based on system congestion information, a channel busy degree, or the like. A manner of obtaining the second threshold and the third threshold is not limited in the present disclosure.

It should be further understood that the preset first threshold in this embodiment of the present disclosure may also be determined based on system congestion information, a channel busy degree, or other information. The preset first threshold may be determined by the network device to be delivered to the first terminal device by using signaling, or may be determined by the first terminal device based on various pieces of congestion information notified by the network device or another terminal device. This is not limited in the present disclosure.

It should be further understood that in this embodiment of the present disclosure, the detecting, by a first terminal device, a plurality of resource locations before a higher layer request arrives includes: detecting, by the first terminal device, the plurality of resource locations based on system congestion information notified by a network device or another terminal device; or detecting, by the first terminal device, the plurality of resource locations based on a notification message of a network device or another terminal device, where the notification message is determined based on system congestion information.

It should be understood that sequence numbers of the foregoing processes do not mean an execution sequence in various embodiments of the present disclosure. The execution sequence of the processes should be determined according to functions and internal logic of the processes, and should not be construed as any limitation on the implementation processes of the embodiments of the present disclosure.

The foregoing describes in detail the resource selection method according to the embodiments of the present disclosure. The following describes a channel transmission apparatus according to embodiments of the present disclosure with reference to FIG. 5 to FIG. 8. Technical features described in the method embodiments are applicable to the following apparatus embodiments.

Figure 5:
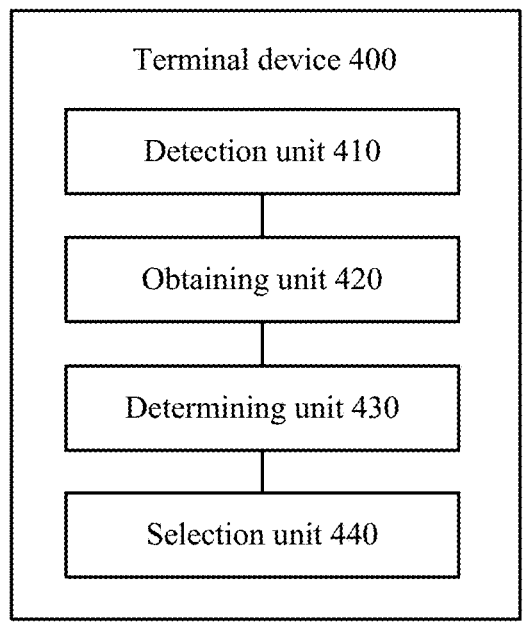
FIG. 5 is a schematic block diagram of a resource selection terminal device according to an embodiment of the present disclosure.

FIG. 5 shows a resource selection terminal device 400 according to an embodiment of the present disclosure. As shown in FIG. 5, the terminal device 400 is a first terminal device, and the terminal device 400 includes:

a detection unit 410, configured to detect a plurality of resource locations before receiving of a higher layer request;

an obtaining unit 420, configured to obtain, based on the plurality of resource locations, a first set in a first time window after the higher layer request is received, where the higher layer request is used to notify the first terminal device that there is to-be-transmitted data and that a sending resource needs to be selected for the to-be-transmitted data;

a determining unit 430, configured to determine that a quantity of resources in the first set is less than a preset first threshold; and a selection unit 440, configured to select, from a resource pool, a resource used to send the to-be-transmitted data, where the resource pool is a resource pool from which the sending resource is randomly selected.

Therefore, if a quantity of resources in an available resource is less than the preset first threshold, the resource selection terminal device in this embodiment of the present disclosure selects a resource from the resource pool in which random selection of the sending resource is allowed, so that impact on sending performance of another terminal device in a system can be reduced and sending performance of the resource selection terminal device can be improved.

Optionally, in this embodiment of the present disclosure, the detection unit 410 is specifically configured to:

detect the plurality of resource locations based on system congestion information notified by a network device; or detect the plurality of resource locations based on a notification message of a network device, where the notification message is determined based on system congestion information.

Optionally, in this embodiment of the present disclosure, the obtaining unit 420 is specifically configured to:

detect that a resource mapped in at least one of the plurality of resource locations belongs to the first time window; and determine, as the first set, a set including the resource mapped in the at least one resource location.

Optionally, in this embodiment of the present disclosure, the obtaining unit 420 is specifically configured to:

detect that a resource mapped in at least one of the plurality of resource locations is a resource in the first time window;

determine that all reserved resources used to send subsequent data that are respectively indicated by N pieces of successfully decoded scheduling assignment information used before the higher layer request is received belong to a set including the resource mapped in the at least one resource location; and determine, as the first set, all resources in the set including the resource mapped in the at least one resource location except a resource in a second set, where the second set includes a sum of the reserved resources indicated by the N pieces of successfully decoded scheduling assignment information, and N is a positive integer.

Optionally, in this embodiment of the present disclosure, the obtaining unit 420 is specifically configured to:

detect that a resource mapped in at least one of the plurality of resource locations is a resource in the first time window;

determine that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determine, as the first set, all resources in the set including the resource mapped in the at least one resource location except a resource in a third set, where the third set includes a sum of the reserved resources indicated by the M pieces of successfully decoded scheduling assignment information, and M is a positive integer.

Optionally, in this embodiment of the present disclosure, the obtaining unit 420 is specifically configured to:

detect that a resource mapped in at least one of the plurality of resource locations is a resource in the first time window; and determine, as the first set, all resources in a set including the resource mapped in the at least one resource location except a resource in a fourth set, where the fourth set includes a resource on which received energy obtained based on a detection result through prediction is greater than a preset third threshold.

Optionally, in this embodiment of the present disclosure, the selected resource used to send the to-be-transmitted data is not used to send subsequent data, and the terminal device further includes:

a sending unit, configured to send scheduling assignment information to a second terminal device, where the scheduling assignment information is used to indicate that the selected resource used to send the to-be-transmitted data is not used to send the subsequent data.

Optionally, in this embodiment of the present disclosure, the resource pool overlaps a resource in the first time window, and the selection unit is specifically configured to:

select, from the resource pool in which random selection of the sending resource is allowed based on K pieces of successfully decoded scheduling assignment information used before the higher layer request is received, the resource used to send the to-be-transmitted data, where all the reserved resources respectively indicated by the K pieces of successfully decoded scheduling assignment information overlap the resource pool in which random selection of the sending resource is allowed, and K is a positive integer.

Optionally, in this embodiment of the present disclosure, the preset first threshold is a quantity of resources that need to be selected by the terminal device; or the preset first threshold is a quantity of resources in a fifth set, and the fifth set is used by the first terminal device to select the sending resource from the fifth set.

It should be understood that the resource selection terminal device 400 according to this embodiment of the present disclosure may be corresponding to the first terminal device in the embodiment of the method 200 in the present disclosure. In addition, the foregoing and other operations and/or functions of the units in the terminal device 400 are respectively intended to implement corresponding procedures of the method in FIG. 2. For brevity, details are not described herein.

Figure 6:
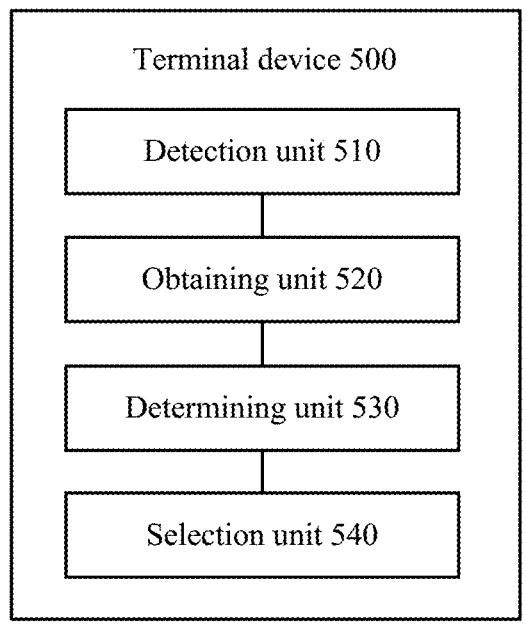
FIG. 6 is another schematic block diagram of a resource selection terminal device according to an embodiment of the present disclosure.

FIG. 6 shows a resource selection terminal device 500 according to an embodiment of the present disclosure. As shown in FIG. 6, the terminal device 500 is a first terminal device, and the terminal device 500 includes:

a detection unit 510, configured to detect a plurality of resource locations before receiving of a higher layer request;

an obtaining unit 520, configured to obtain, based on the plurality of resource locations, a first set in a first time window after the higher layer request is received, where the higher layer request is used to notify the first terminal device that there is to-be-transmitted data and that a sending resource needs to be selected for the to-be-transmitted data;

a determining unit 530, configured to determine that a quantity of resources in the first set is less than a preset first threshold, where the preset first threshold is a quantity of resources in a fifth set, and the fifth set is used by the first terminal device to select the sending resource from the fifth set; and a selection unit 540, configured to select, from the first set, a resource used to send the to-be-transmitted data, where the selected resource used to send the to-be-transmitted data is not used to send subsequent data.

Therefore, when determining that the quantity of resources in the first set is less than the preset first threshold, the resource selection terminal device in this embodiment of the present disclosure does not reserve resources for the subsequent data, so that a continuous collision between resources can be avoided.

Optionally, in this embodiment of the present disclosure, the detection unit 510 is specifically configured to:

detect the plurality of resource locations based on system congestion information notified by a network device; or detect the plurality of resource locations based on a notification message of a network device, where the notification message is determined based on system congestion information.

Optionally, in this embodiment of the present disclosure, the obtaining unit 520 is specifically configured to:

detect that a resource mapped in at least one of the plurality of resource locations is a resource in the first time window; and determine, as the first set, a set including the resource mapped in the at least one resource location.

Optionally, in this embodiment of the present disclosure, the obtaining unit 520 is specifically configured to:

detect that a resource mapped in at least one of the plurality of resource locations is a resource in the first time window;

determine that all reserved resources used to send subsequent data that are respectively indicated by N pieces of successfully decoded scheduling assignment information used before the higher layer request is received belong to a set including the resource mapped in the at least one resource location; and determine, as the first set, all resources in the set including the resource mapped in the at least one resource location except a resource in a second set, where the second set includes a sum of the reserved resources indicated by the N pieces of successfully decoded scheduling assignment information, and N is a positive integer.

Optionally, in this embodiment of the present disclosure, the obtaining unit 520 is specifically configured to:

detect that a resource mapped in at least one of the plurality of resource locations is a resource in the first time window;

determine that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determine, as the first set, all resources in the set including the resource mapped in the at least one resource location except a resource in a third set, where the third set includes a sum of the reserved resources indicated by the M pieces of successfully decoded scheduling assignment information, and M is a positive integer.

Optionally, in this embodiment of the present disclosure, the obtaining unit 520 is specifically configured to:

detect that a resource mapped in at least one of the plurality of resource locations belongs to the first time window; and determine, as the first set, all resources in a set including the resource mapped in the at least one resource location except a resource in a fourth set, where the fourth set includes a resource on which received energy obtained based on a detection result through prediction is greater than a preset third threshold.

Optionally, in this embodiment of the present disclosure, the terminal device 500 further includes:

a sending unit, configured to send scheduling assignment information to a second terminal device, where the scheduling assignment information is used to indicate that the selected resource used to send the to-be-transmitted data is not used to send the subsequent data.

It should be understood that the resource selection terminal device 500 according to this embodiment of the present disclosure may be corresponding to the first terminal device in the embodiment of the method 300 in the present disclosure. In addition, the foregoing and other operations and/or functions of the units in the terminal device 500 are respectively intended to implement corresponding procedures of the method in FIG. 4. For brevity, details are not described herein.

Figure 7:
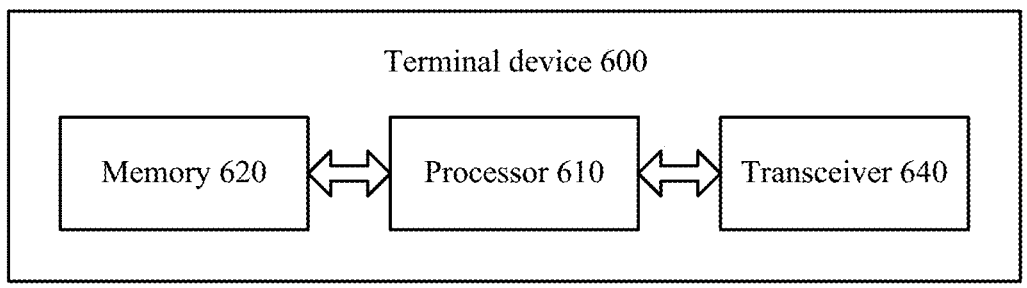
FIG. 7 is still another schematic block diagram of a resource selection terminal device according to an embodiment of the present disclosure.

As shown in FIG. 7, an embodiment of the present disclosure further provides a resource selection terminal device 600. The terminal device 600 includes a processor 610, a memory 620, and a transceiver 640. The memory 620 is configured to store an instruction. The processor 610 is configured to execute the instruction stored in the memory 620, to control the transceiver 640 to send a signal. The processor 610 is configured to: detect a plurality of resource locations before receiving of a higher layer request; obtain, based on the plurality of resource locations, a first set in a first time window after the higher layer request is received, where the higher layer request is used to notify the first terminal device that there is to-be-transmitted data and that a sending resource needs to be selected for the to-be-transmitted data; determine that a quantity of resources in the first set is less than a preset first threshold; and select, from a resource pool, a resource used to send the to-be-transmitted data, where the resource pool is a resource pool from which the sending resource is randomly selected.

Therefore, if a quantity of resources in an available resource is less than the preset first threshold, the resource selection terminal device in this embodiment of the present disclosure selects a resource from the resource pool in which random selection of the sending resource is allowed, so that impact on sending performance of another terminal device in a system can be reduced and sending performance of the resource selection terminal device can be improved.

It should be understood that in this embodiment of the present disclosure, the processor 610 may be a central processing unit (CPU), or the processor 610 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

The memory 620 may include a read-only memory and a random access memory, and provide an instruction and data for the processor 610. A part of the memory 620 may further include a non-volatile random access memory. For example, the memory 620 may further store information about a device type.

In an implementation process, each step of the foregoing method may be completed by using an integrated logical circuit of hardware in the processor 610 or an instruction in a form of software. The steps of the methods disclosed with reference to the embodiments of the present disclosure may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 620, and the processor 610 reads information from the memory 620 and implements the steps of the foregoing method in combination with hardware of the processor 610. To avoid repetition, details are not described herein.

Optionally, in this embodiment of the present disclosure, the processor 610 is specifically configured to:

detect the plurality of resource locations based on system congestion information notified by a network device; or detect the plurality of resource locations based on a notification message of a network device, where the notification message is determined based on system congestion information.

Optionally, in this embodiment of the present disclosure, the processor 610 is specifically configured to:

detect that a resource mapped in at least one of the plurality of resource locations is a resource in the first time window; and determine, as the first set, a set including the resource mapped in the at least one resource location.

Optionally, in this embodiment of the present disclosure, the processor 610 is specifically configured to:

detect that a resource mapped in at least one of the plurality of resource locations is a resource in the first time window;

determine that all reserved resources used to send subsequent data that are respectively indicated by N pieces of successfully decoded scheduling assignment information used before the higher layer request is received belong to a set including the resource mapped in the at least one resource location; and determine, as the first set, all resources in the set including the resource mapped in the at least one resource location except a resource in a second set, where the second set includes a sum of the reserved resources indicated by the N pieces of successfully decoded scheduling assignment information, and N is a positive integer.

Optionally, in this embodiment of the present disclosure, the processor 610 is specifically configured to:

detect that a resource mapped in at least one of the plurality of resource locations is a resource in the first time window;

determine that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determine, as the first set, all resources in the set including the resource mapped in the at least one resource location except a resource in a third set, where the third set includes a sum of the reserved resources indicated by the M pieces of successfully decoded scheduling assignment information, and M is a positive integer.

Optionally, in this embodiment of the present disclosure, the processor 610 is specifically configured to:

detect that a resource mapped in at least one of the plurality of resource locations is a resource in the first time window; and determine, as the first set, all resources in a set including the resource mapped in the at least one resource location except a resource in a fourth set, where the fourth set includes a resource on which received energy obtained based on a detection result through prediction is greater than a preset third threshold.

Optionally, in this embodiment of the present disclosure, the selected resource used to send the to-be-transmitted data is not used to send subsequent data, and the processor 610 is further configured to:

send scheduling assignment information to a second terminal device, where the scheduling assignment information is used to indicate that the selected resource used to send the to-be-transmitted data is not used to send the subsequent data.

Optionally, in this embodiment of the present disclosure, the resource pool overlaps a resource in the first time window, and the processor 610 is specifically configured to:

select, from the resource pool in which random selection of the sending resource is allowed based on K pieces of successfully decoded scheduling assignment information used before the higher layer request is received, the resource used to send the to-be-transmitted data, where all the reserved resources respectively indicated by the K pieces of successfully decoded scheduling assignment information overlap the resource pool in which random selection of the sending resource is allowed, and K is a positive integer.

Optionally, in this embodiment of the present disclosure, the preset first threshold is a quantity of resources that need to be selected by the terminal device; or the preset first threshold is a quantity of resources in a fifth set, and the fifth set is used by the first terminal device to select the sending resource from the fifth set.

It should be understood that the resource selection terminal device 600 according to this embodiment of the present disclosure may be corresponding to the terminal device in the embodiments of the present disclosure and the terminal device 400, and may be corresponding to the first terminal device that performs the method 200 in the embodiment of the present disclosure. In addition, the foregoing and other operations and/or functions of the units in the terminal device 600 are respectively intended to implement corresponding procedures of the method in FIG. 2. For brevity, details are not described herein.

Figure 8:
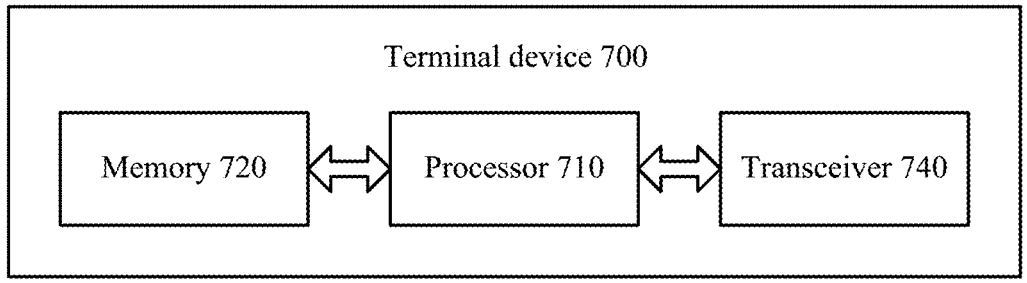
FIG. 8 is still another schematic block diagram of a resource selection terminal device according to an embodiment of the present disclosure.

As shown in FIG. 8, an embodiment of the present disclosure further provides a resource selection terminal device 700. The terminal device 700 includes a processor 710, a memory 720, and a transceiver 740. The memory 720 is configured to store an instruction. The processor 710 is configured to execute the instruction stored in the memory 720, to control the transceiver 740 to send a signal. The processor 710 is configured to: detect a plurality of resource locations before receiving of a higher layer request; obtain, based on the plurality of resource locations, a first set in a first time window after the higher layer request is received, where the higher layer request is used to notify the first terminal device that there is to-be-transmitted data and that a sending resource needs to be selected for the to-be-transmitted data; determine that a quantity of resources in the first set is less than a preset first threshold, where the preset first threshold is a quantity of resources in a fifth set, and the fifth set is used by the first terminal device to select the sending resource from the fifth set; and select, from the first set, a resource used to send the to-be-transmitted data, where the selected resource used to send the to-be-transmitted data is not used to send subsequent data.

Therefore, when determining that the quantity of resources in the first set is less than the preset first threshold, the resource selection terminal device in this embodiment of the present disclosure does not reserve resources for the subsequent data, so that a continuous collision between resources can be avoided.

It should be understood that in this embodiment of the present disclosure, the processor 710 may be a central processing unit (CPU), or the processor 710 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor, or the like.

The memory 720 may include a read-only memory and a random access memory, and provide an instruction and data for the processor 710. A part of the memory 720 may further include a non-volatile random access memory. For example, the memory 720 may further store information about a device type.

In an implementation process, each step of the foregoing method may be completed by using an integrated logical circuit of hardware in the processor 710 or an instruction in a form of software. The steps of the methods disclosed with reference to the embodiments of the present disclosure may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 720, and the processor 710 reads information from the memory 720 and implements the steps of the foregoing method in combination with hardware of the processor 710. To avoid repetition, details are not described herein.

Optionally, in this embodiment of the present disclosure, the processor 710 is specifically configured to:

detect the plurality of resource locations based on system congestion information notified by a network device; or detect the plurality of resource locations based on a notification message of a network device, where the notification message is determined based on system congestion information.

Optionally, in this embodiment of the present disclosure, the processor 710 is specifically configured to:

detect that a resource mapped in at least one of the plurality of resource locations is a resource in the first time window; and determine, as the first set, a set including the resource mapped in the at least one resource location.

Optionally, in this embodiment of the present disclosure, the processor 710 is specifically configured to:

detect that a resource mapped in at least one of the plurality of resource locations belongs to the first time window;

determine that all reserved resources used to send subsequent data that are respectively indicated by N pieces of successfully decoded scheduling assignment information used before the higher layer request is received belong to a set including the resource mapped in the at least one resource location; and determine, as the first set, all resources in the set including the resource mapped in the at least one resource location except a resource in a second set, where the second set includes a sum of the reserved resources indicated by the N pieces of successfully decoded scheduling assignment information, and N is a positive integer.

Optionally, in this embodiment of the present disclosure, the processor 710 is specifically configured to:

detect that a resource mapped in at least one of the plurality of resource locations is a resource in the first time window;

determine that all reserved resources used to send subsequent data that are respectively indicated by M pieces of successfully decoded scheduling assignment information used before the higher layer request is received belong to a set including the resource mapped in the at least one resource location, and that reference signal received power RSRP on resources used to send current data that are respectively indicated by the M pieces of successfully decoded scheduling assignment information is greater than a preset second threshold; and determine, as the first set, all resources in the set including the resource mapped in the at least one resource location except a resource in a third set, where the third set includes a sum of the reserved resources indicated by the M pieces of successfully decoded scheduling assignment information, and M is a positive integer.

Optionally, in this embodiment of the present disclosure, the processor 710 is specifically configured to:

detect that a resource mapped in at least one of the plurality of resource locations is a resource in the first time window; and determine, as the first set, all resources in a set including the resource mapped in the at least one resource location except a resource in a fourth set, where the fourth set includes a resource on which received energy obtained based on a detection result through prediction is greater than a preset third threshold.

Optionally, in this embodiment of the present disclosure, the processor 710 is further configured to:

send scheduling assignment information to a second terminal device, where the scheduling assignment information is used to indicate that the selected resource used to send the to-be-transmitted data is not used to send the subsequent data.

It should be understood that the resource selection terminal device 700 according to this embodiment of the present disclosure may be corresponding to the terminal device in the embodiments of the present disclosure and the terminal device 500, and may be corresponding to the first terminal device that performs the method 300 in the embodiment of the present disclosure. In addition, the foregoing and other operations and/or functions of the units in the terminal device 700 are respectively intended to implement corresponding procedures of the method in FIG. 4. For brevity, details are not described herein.

It should be understood that in the embodiments of the present disclosure, "B corresponding to A" indicates that B is associated with A, and B may be determined based on A. However, it should further be understood that determining B based on A does not mean that B is determined based on A only; that is, B may also be determined based on A and/or other information.

A person of ordinary skill in the art may be aware that, the units and algorithm steps in the examples described with reference to the embodiments disclosed herein may be implemented by electronic hardware, computer software, or a combination of the electronic hardware and the computer software. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system. In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any person skilled in the art may readily figure out various equivalent modifications or replacements without departing from the technical scope disclosed in the present disclosure.

What is claimed is:

1. A resource selection method, comprising:
    detecting, by a first terminal device, a plurality of resource locations before receiving a higher layer request;
    receiving the higher layer request, wherein the higher layer request notifies the first terminal device that there is to-be-transmitted data and that a sending resource needs to be selected for the to-be-transmitted data;
    obtaining, by the first terminal device based on the plurality of resource locations, a first set in a first time window after the higher layer request is received;
    determining, by the first terminal device, that a quantity of resources in the first set is less than a preset first threshold, wherein the preset first threshold is a quantity of resources in a second set, and the second set is usable by the first terminal device to select the sending resource from the second set; and
    in response to determining that the quantity of resources in the first set is less than the preset first threshold, selecting, by the first terminal device from the first set, a resource for sending the to-be-transmitted data, wherein the selected resource for sending the to-be-transmitted data is not reserved to be used by the first terminal device for sending subsequent data.

2. The method according to claim 1, wherein detecting, by the first terminal device, the plurality of resource locations comprises:
    detecting, by the first terminal device, the plurality of resource locations based on system congestion information received from a network device; or
    detecting, by the first terminal device, the plurality of resource locations based on a notification message received from a network device, wherein the notification message is determined based on system congestion information.

3. The method according to claim 1, further comprising:
    sending, by the first terminal device, scheduling assignment information to a second terminal device, wherein the scheduling assignment information indicates to the second terminal device that the selected resource for sending the to-be-transmitted data is not reserved to be used by the first terminal device for sending the subsequent data.

4. A resource selection terminal device, comprising:
a processor; and
a non-transitory computer-readable storage medium storing a program to be executed by the processor, the program including instructions for:
   detecting a plurality of resource locations before receiving a higher layer request;
   receiving the higher layer request, wherein the higher layer request notifies the terminal device that there is to-be-transmitted data and that a sending resource needs to be selected for the to-be-transmitted data;
   obtaining, based on the plurality of resource locations, a first set in a first time window after the higher layer request is received, wherein obtaining the first set in the first time window comprises:
      detecting that a resource mapped in at least one of the plurality of resource locations is a resource in the first time window;
      determining that all reserved resources for sending subsequent data that are respectively indicated by N pieces of successfully decoded scheduling assignment information used before the higher layer request is received belong to a set comprising the resource mapped in the at least one resource location; and
      determining, as the first set, all resources in the set comprising the resource mapped in the at least one resource location except a resource in a second set, wherein the second set comprises a sum of the reserved resources indicated by the N pieces of successfully decoded scheduling assignment information, and N is a positive integer;
   determining that a quantity of resources in the first set is less than a preset first threshold; and
   in response to determining that the quantity of resources in the first set is less than the preset first threshold, randomly selecting a resource from a resource pool for sending the to-be-transmitted data.

5. The terminal device according to claim 4, wherein the instructions for detecting the plurality of resource locations include instructions for:
   detecting the plurality of resource locations based on system congestion information received from a network device; or
   detecting the plurality of resource locations based on a notification message received from a network device, wherein the notification message is determined based on system congestion information.

6. The terminal device according to claim 4, wherein:
the selected resource for sending the to-be-transmitted data is not reserved to be used by the terminal device for sending subsequent data; and the program further includes instructions for:
sending scheduling assignment information to a second terminal device indicating that the selected resource for sending the to-be-transmitted data is not reserved to be used by the terminal device for sending the subsequent data.

7. The terminal device according to claim 4, wherein :
the resource pool overlaps a resource in the first time window; and
the program further includes instructions comprising:
   selecting, from the resource pool based on K pieces of successfully decoded scheduling assignment information used before the higher layer request is received, the resource for sending the to-be-transmitted data, wherein all the reserved resources respectively indicated by the K pieces of successfully decoded scheduling assignment information overlap the resource pool, and K is a positive integer.

8. A resource selection terminal device, comprising:
a processor; and
a non-transitory computer-readable storage medium storing a program to be executed by the processor, the program including instructions for:
   detecting a plurality of resource locations before receiving of a higher layer request;
   receiving the higher layer request, wherein the higher layer request notifies the terminal device that there is to-be-transmitted data and that a sending resource needs to be selected for the to-be-transmitted data;
   obtaining, based on the plurality of resource locations, a first set in a first time window after the higher layer request is received;
   determining that a quantity of resources in the first set is less than a preset first threshold, wherein the preset first threshold is a quantity of resources in a second set, and the second set is usable by the terminal device to select the sending resource from the second set; and
   in response to determining that the quantity of resources in the first set is less than the preset first threshold, selecting a resource for sending the to-be-transmitted data from the first set, wherein the selected resource for sending the to-be-transmitted data is not reserved to be used by the terminal device for sending subsequent data.

9. The terminal device according to claim 8, wherein the instructions for detecting the plurality of resource locations includes instructions for:
   detecting the plurality of resource locations based on system congestion information received from a network device; or
   detecting the plurality of resource locations based on a notification message received from a network device, wherein the notification message is determined based on system congestion information.

10. The terminal device according to claim 8, wherein the instructions for obtaining, based on the plurality of resource locations, the first set in the first time window, include instructions for:
   detecting that a resource mapped in at least one of the plurality of resource locations is a resource in the first time window; and
   determining, as the first set, a set comprising the resource mapped in the at least one resource location.

11. The terminal device according to claim 8, the instructions for obtaining, based on the plurality of resource locations, the first set in the first time window, include instructions for:
   detecting that a resource mapped in at least one of the plurality of resource locations is a resource in the first time window;
   determining that all reserved resources for sending subsequent data that are respectively indicated by N pieces of successfully decoded scheduling assignment information used before the higher layer request is received belong to a set comprising the resource mapped in the at least one resource location; and
   determining, as the first set, all resources in the set comprising the resource mapped in the at least one resource location except a resource in a third set, wherein the third set comprises a sum of the reserved resources indicated by the N pieces of successfully decoded scheduling assignment information, and N is a positive integer.

12. The terminal device according to claim 8, the instructions for obtaining, based on the plurality of resource locations, the first set in the first time window, include instructions for:
   detecting that a resource mapped in at least one of the plurality of resource locations is a resource in the first time window;
   determining that all reserved resources for sending subsequent data that are respectively indicated by M pieces of successfully decoded scheduling assignment information used before the higher layer request is received belong to a set comprising the resource mapped in the at least one resource location, and that reference signal received power (RSRP) on resources for sending current data that are respectively indicated by the M pieces of successfully decoded scheduling assignment information is greater than a preset second threshold; and
   determining, as the first set, all resources in the set comprising the resource mapped in the at least one resource location except a resource in a third set, wherein the third set comprises a sum of the reserved resources indicated by the M pieces of successfully decoded scheduling assignment information, and M is a positive integer.

13. The terminal device according to claim 8, wherein the instructions for obtaining, based on the plurality of resource locations, the first set in the first time window, include instructions for:
   detecting that a resource mapped in at least one of the plurality of resource locations is a resource in the first time window; and
   determining, as the first set, all resources in a set comprising the resource mapped in the at least one resource location except a resource in a third set, wherein the third set comprises a resource on which received energy obtained based on a detection result through prediction is greater than a preset second threshold.

14. The terminal device according to claim 8, wherein the terminal device further comprises:
   a transmitter, configured to send scheduling assignment information to a second terminal device for indicating that the selected resource for sending the to-be-transmitted data is not reserved by the terminal device to be used for sending the subsequent data.

* * * * *